US012768365B2

(12) United States Patent
Zhou et al.

(10) Patent No.: US 12,768,365 B2
(45) Date of Patent: Oct. 20, 2026

(54) CENTRIFUGAL FAN WITH BACK BLADES

(71) Applicant: ABB SCHWEIZ AG, Baden (CH)

(72) Inventors: Xiaoliang Zhou, Shanghai (CN); Yang Xu, Shanghai (CN); Weimin Li, Shanghai (CN)

(73) Assignee: ABB SCHWEIZ AG, Baden (CH)

(*) Notice: Subject to any disclaimer, the term of this patent is extended or adjusted under 35 U.S.C. 154(b) by 189 days.

(21) Appl. No.: 18/735,395

(22) Filed: Jun. 6, 2024

(65) Prior Publication Data

US 2024/0328429 A1 Oct. 3, 2024

Related U.S. Application Data

(63) Continuation of application No. PCT/CN2022/070580, filed on Jan. 6, 2022.

(51) Int. Cl.

| | |
|---|---|
| ***F04D 29/28*** | (2006.01) |
| ***F04D 1/00*** | (2006.01) |
| ***H02K 9/06*** | (2006.01) |

(52) U.S. Cl.

CPC ............. *F04D 29/281* (2013.01); *F04D 1/00* (2013.01); *H02K 9/06* (2013.01)

(58) Field of Classification Search

CPC .......... F04D 29/281; F04D 1/00; F04D 29/30; H02K 9/06

USPC ........................................................... 310/62

See application file for complete search history.

(56) References Cited

U.S. PATENT DOCUMENTS

| | | | | |
|---|---|---|---|---|
| 2004/0150270 A1 | 8/2004 | Nagayama et al. | | |
| 2007/0133347 A1* | 6/2007 | Mok | A47J 43/046 | 366/205 |
| 2013/0251560 A1* | 9/2013 | Xue | F04D 29/444 | 417/410.1 |
| 2018/0135651 A1 | 5/2018 | Howe | | |
| 2020/0052548 A1 | 2/2020 | Rogginger et al. | | |

FOREIGN PATENT DOCUMENTS

| | | | | |
|---|---|---|---|---|
| CN | 2766074 Y | 3/2006 | | |
| CN | 202301162 U | 7/2012 | | |
| CN | 104638835 A | 5/2015 | | |
| CN | 205714930 U | 11/2016 | | |
| CN | 209976885 U | 1/2020 | | |
| CN | 210509652 U | 5/2020 | | |
| CN | 213574817 U | 6/2021 | | |
| CN | 113206577 A | 8/2021 | | |
| CN | 214424777 U | 10/2021 | | |
| GB | 737785 A | 10/1955 | | |
| GB | 2385715 * | 8/2003 | H02K 9/06 | |

* cited by examiner

*Primary Examiner* — Ahmed Elnakib

(74) *Attorney, Agent, or Firm* — Greenberg Traurig, LLP

(57) ABSTRACT

An electrical machine that includes a centrifugal fan. The centrifugal fan is for cooling an electrical machine and configured to rotate around a rotating axis. The centrifugal fan includes a first plate with an air inlet configured to face a rotor of the electrical machine to receive air; a second plate spaced apart from the first plate in a direction parallel to the rotating axis (R); a plurality of first blades arranged between the first plate and the second plate; and a plurality of second blades arranged on a side of the second plate away from the first plate and configured to reduce an air pressure in vicinity of the second plate.

17 Claims, 5 Drawing Sheets

CENTRIFUGAL FAN WITH BACK BLADES

CROSS-REFERENCE TO RELATED APPLICATIONS

This application claims priority to and is a continuation application of international patent application number PCT/CN2022/070580, filed on Jan. 6, 2022, which is herein incorporated by reference in its entirety.

FIELD

Embodiments of the present disclosure generally relate to the field of electrical device, and more particularly, to a centrifugal fan with back blades and an electrical machine.

BACKGROUND

Conventionally, in order to dissipate the heat generated by an electrical machine, such as an electric generator or a motor, a cooling fan is installed on a rotor shaft of the electrical machine and used for circulating the air inside the electrical machine. One type of cooling fan is centrifugal fan. The centrifugal fan is fixed on the rotor shaft and rotates along with the rotor shaft during the operation of the electrical machine. Conventionally, the centrifugal fan comprises two plates and blades therebetween. Both of the plates are subjected to air pressure simultaneously. In some cases, sleeve bearings are arranged to support the rotor shaft at two end covers of the electrical machine. In these cases, an axial force will be generated due to the difference between the air pressures applied to the two plates of the centrifugal fan, which may cause the rotor to move axially. In severe cases, the bearings will be worn out, leading to mechanical failures, etc. Therefore, it is important to keep the balance of the air pressure applied to the centrifugal fan.

SUMMARY

In view of the foregoing problems, example embodiments of the present disclosure propose a centrifugal fan that has additional back blades provided on the back side of the second plate of the centrifugal fan away from the rotor to reduce the air pressure in vicinity of the second plate.

In a first aspect of the present disclosure, a centrifugal fan is provided. The centrifugal fan is used for cooling an electrical machine, and configured to rotate around a rotating axis. The centrifugal fan comprises: a first plate comprising an air inlet configured to face the electrical machine to receive air; a second plate spaced apart from the first plate in a direction parallel to the rotating axis; a plurality of first blades arranged between the first plate and the second plate; and a plurality of second blades arranged on a side of the second plate away from the first plate and configured to reduce an air pressure in vicinity of the second plate.

According to embodiments of the present disclosure, the first plate facing the rotor of the electrical machine is usually referred to as the front plate and configured to receive airflow coming from the rotor. The second plate is in the downstream with regard to the direction of the airflow. Therefore, the second plate is usually referred to as the back plate. It should be appreciated that the terms “front” and “back” used herein are with regard to the axial direction from the rotor towards the centrifugal fan. The term “front” refers to a position closer to the rotor and the term “back” refers to a position further from the rotor.

With these embodiments, by providing a plurality of blades on the back side of second plate, i.e. the side away from the rotor, the airflow in vicinity of the second plate will be accelerated during operation of the electrical machine, thereby reducing the air pressure applied to the back side of the second plate to reduce the difference between the air pressure applied to the first plate and the second plate, thus reducing the resultant force in axial direction and avoiding the axial movement of the rotor, so that the risk of mechanical failure of the electrical machine is reduced.

In some embodiments, the plurality of second blades is dimensioned to minimize a resultant pressure applied to the centrifugal fan in the direction parallel to the rotating axis. With these embodiments, the dimension of the blade may include the size and the shape of the blade. The dimension of the blade may affect the effect of the pressure reduction. Therefore, by regulating the dimension of the second blades, the air pressure applied to the second blade can be optimized to approximate the air pressure applied to the first blade as much as possible so that a resultant pressure applied to the centrifugal fan can be minimized.

In some embodiments, the dimension of the plurality of second blades is determined based on an outer diameter of the centrifugal fan, a width of the centrifugal fan in the direction parallel to the rotating axis and a distance between the centrifugal fan and an end cover of the electrical machine close to the centrifugal fan. With these embodiments, the dimension of the second blade can be selected. Specifically, the axial width of the second blade is positively proportional to the width of the centrifugal fan. Since the width of the centrifugal fan generally depends on the width of the first blades, the axial width of the second blade may also be positively proportional to the width of the first blade. Further, the radial height of the second blade is proportional to the outer diameter of the centrifugal fan. In addition, the width of the second blade is positively proportional to the axial distance between the centrifugal fan and the end cover of the electrical machine close to the centrifugal fan.

In some embodiments, each of the plurality of first blades has a first arc shape and each of the plurality of the second blades has a second arc shape, and wherein a curvature of the first arc shape is the same as a curvature of the second arc shape. The arc shape may be forward curved or backward curved. With these embodiments, by configuring the second blades with a same shape as the first blades, the characteristic of the first blades can be maintained by the second blades, thereby achieving better performance.

In some embodiments, each of the plurality of first blades is integrally formed with a respective one of the plurality of second blades, and the second plate comprises a plurality of mounting holes each arranged to support the respective first blade and the respective second blade. With these embodiments, by integrating the first blade with the respective second blade, the mounting complexity can be reduced.

In some embodiments, a cross section of the second blades in a direction perpendicular to the rotating axis is the same as that of the respective mounting hole. With these embodiments, the second blades can be formed by a portion of the first blade protruding through the mounting hole, thereby reducing welding stress and manufacturing costs.

In some alternative embodiments, each of the plurality of second blades extends in a radial direction with respect to the rotating axis. With these embodiments, the complexity of design for the second blades is minimized.

In some embodiments, the plurality of the second blades is distributed symmetrically on the second plate with respect to the rotating axis. With these embodiments, by symmetrical distribution of the second blades, the air pressure applied to the second plate will be evenly distributed.

In some embodiments, the number of the second blades is the same as the number of the first blades. With these embodiments, by arranging the same number of the first blades and the second blades, the difference of the distribution of the air pressure on both sides of the second plate can be reduced.

In a second aspect of the present disclosure, an electrical machine is provided. The electrical machine comprises a housing, comprising two end covers at two axial ends of the housing; a rotor shaft rotatably arranged in two sleeve bearings at the two end covers; and a centrifugal fan according to the first aspect of the present disclosure, arranged around the rotor shaft.

With these embodiments, by providing such a centrifugal fan, the axial movement of the rotor of the electrical machine will be avoided, thereby eliminating a risk of failure.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an exemplary and in a non-limiting manner, wherein.

Throughout the drawings, the same or similar reference symbols are used to indicate the same or similar elements.

DETAILED DESCRIPTION OF EMBODIMENTS

Figure 1:
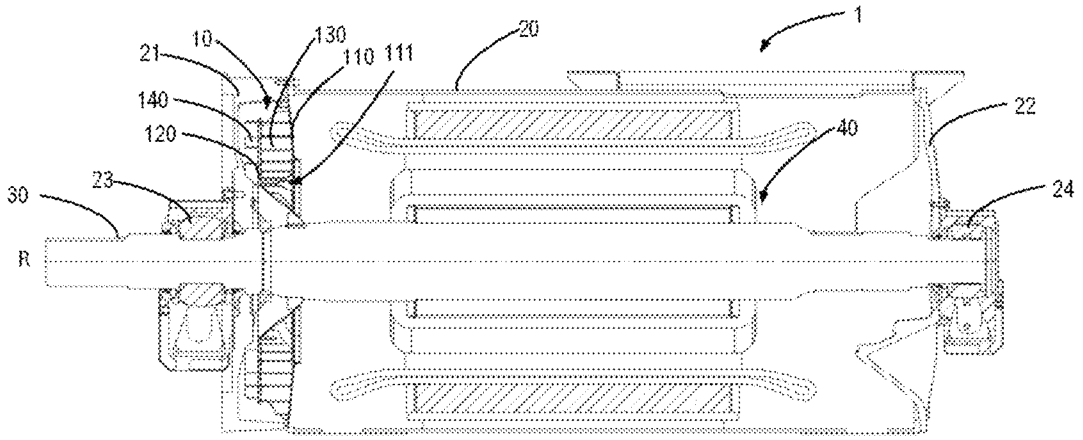
FIG. 1 schematically illustrates a cross-sectional view of an electrical machine according to some embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

As described above, during the operation of the electrical machine, the air pressures are simultaneously applied to the back and front plates of the centrifugal fan, and the difference between the air pressures applied on the both side of the centrifugal fan generates an axial force, which causes the rotor to move axially. If this situation is not properly dealt with, there will be a high risk of wearing of the sleeve bearing and mechanical failure. Conventionally, in order to deal with this problem, it is known to use sleeve bearings with thrust surface. However, the sleeve bearings with thrust surface are expensive and the sleeve bearing with thrust surface only allows a small range of axial movement of the rotor, which limits the application situations of the electrical machine. To address the fallbacks discussed above, example embodiments of the present disclosure relate to a centrifugal fan with additional blades for balancing the pressures.

Figure 2:
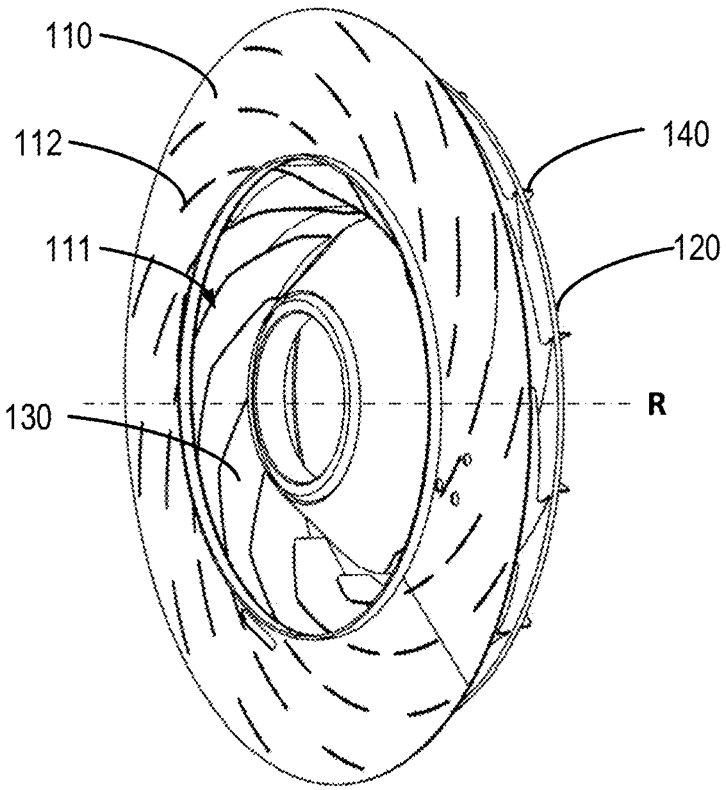
FIG. 2 schematically illustrates a perspective view of a centrifugal fan viewed from a front side according to some embodiments of the present disclosure.
Figure 3:
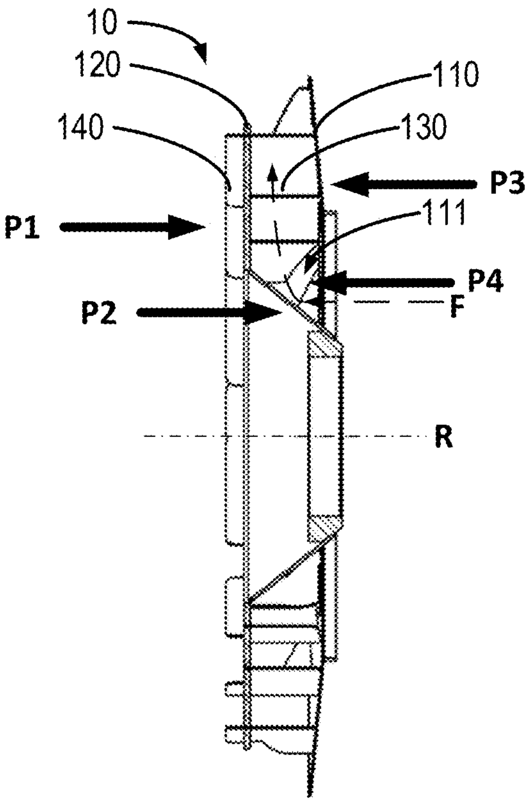
FIG. 3 schematically illustrates a cross-sectional view of the centrifugal fan of FIG. 2.
Figure 4:
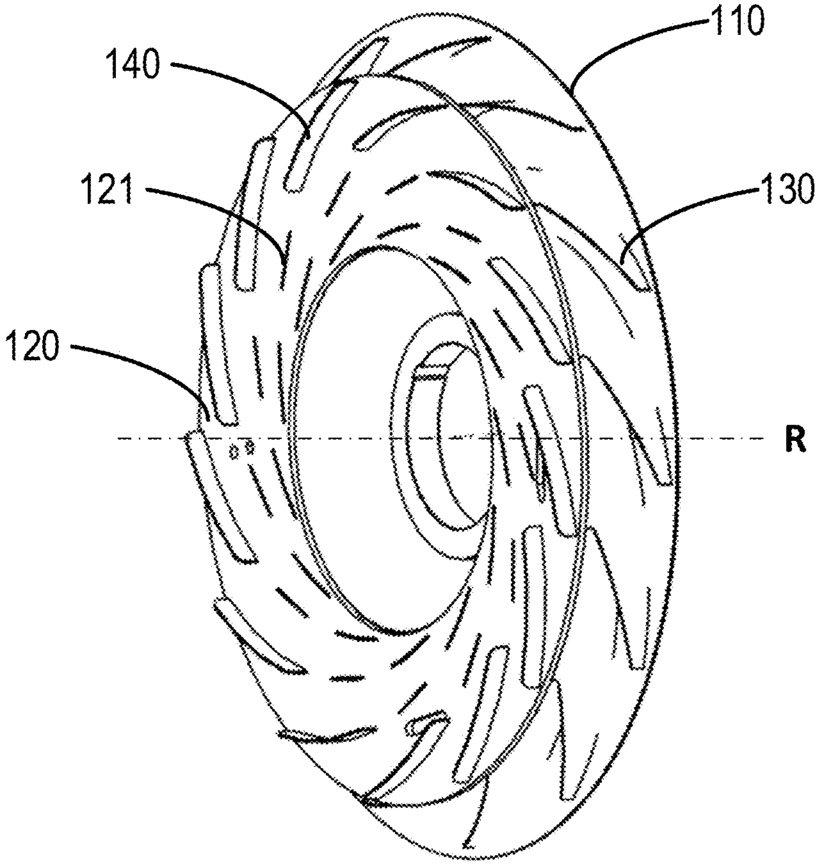
FIG. 4 schematically illustrates a perspective view of a centrifugal fan viewed from a back side according to some embodiments of the present disclosure.
Figure 5:
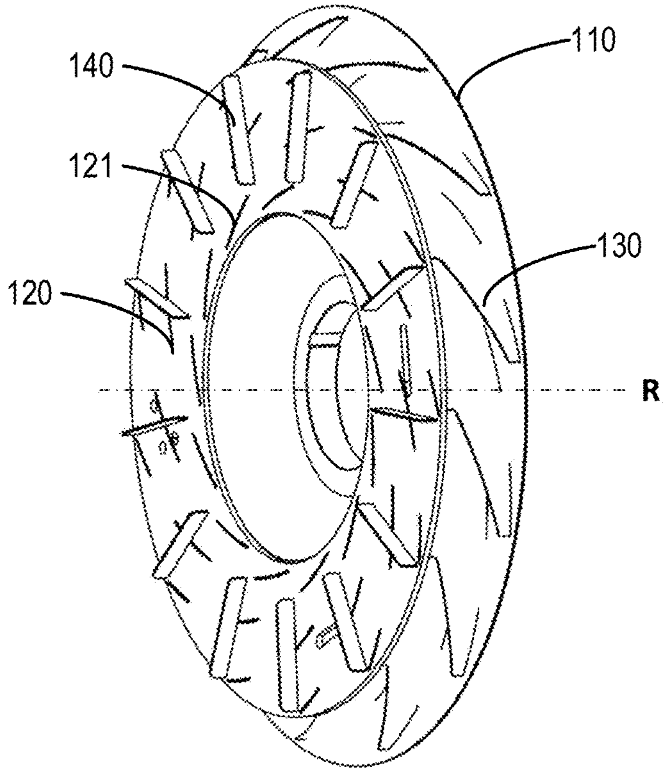
FIG. 5 schematically illustrates a perspective view of a centrifugal fan viewed from the back side according to some further embodiments of the present disclosure.

In the following, example constructions and operating principles of an electrical machine and centrifugal fan will be described with reference to FIGS. 1-5. FIG. 1 schematically illustrates an electrical machine according to some embodiments of the present disclosure. FIGS. 2-3 schematically illustrate a centrifugal fan according to some embodiments of the present disclosure in different perspectives in general. FIG. 4 schematically illustrates a centrifugal fan with arc-shaped back blades according to some embodiments of the present disclosure and FIG. 5 schematically illustrates a centrifugal fan with radial back blades according to some further embodiments of the present disclosure.

FIG. 1 schematically illustrate a cross-sectional view of an electrical machine 1 according to some embodiments of the present disclosure. The electrical machine 1 may be a generator or a motor. As illustrated in FIG. 1, the electrical machine 1 comprises a housing 20. Two end covers are arranged at two axial ends along the rotating axis R respectively, namely, a first end cover 21 and a second cover 22. At the both of the end covers, two sleeve bearings are mounted, i.e. a first sleeve bearing 23 and a second sleeve bearing 24. A rotor shaft 30 is rotatably arranged in the first sleeve bearing 23 and the second sleeve bearing 24. The electrical machine 1 further comprises a centrifugal fan 10 and a rotor 40 arranged around the rotor shaft 30. For example, the centrifugal fan 10 is fixed on the rotor shaft 30 and rotates together with the rotor shaft 30 during the operation of the electrical machine 1 so that the air inside the electrical machine 1 can circulate to dissipate the heat generated by the operation of the electrical machine 1. In this embodiment, the centrifugal fan 10 is arranged close to the first end cover 21 of the housing 20.

The centrifugal fan 10 comprises a first plate 110 and a second plate 120. The first plate 110 comprises an air inlet 111. A plurality of first blades 130 are arranged between the first plate 110 and the second plate 120. The air inlet 111 faces the rotor 40. During the operation of the electrical machine 1, the rotor shaft 30 rotates around a rotating axis R. The rotor 40 and centrifugal fan 10 arranged around the rotor shaft 30 rotates together with the rotor shaft 30. In this case, the rotation of the centrifugal fan 10 will cause the air to flow towards the centrifugal fan 10. The first plate 110 and the second plate 120 will both be subjected to air pressures. In order to balance the pressures applied to the centrifugal fan 10, a plurality of second blades 140 are arranged on the back side of the second plate 120. The plurality of second blades 140 extend parallel to the rotating axis R from the second plate 120 towards the first end cover 21.

The detailed structure of the centrifugal fan 10 will be described below with reference to FIGS. 2-3.

FIG. 2 schematically illustrates a perspective view of a centrifugal fan 10 viewed from a front side according to some embodiments of the present disclosure. As illustrated in FIG. 2, the centrifugal fan 10 comprises a first plate 110 which may also be referred to as the front plate. The first plate 110 faces the rotor 40. An air inlet 111 is provided in the center of the first plate 110 and configured to allow air to flow through the first plate 110. In the embodiment as illustrated in FIG. 2, a plurality of mounting holes 112 are provided on the first plate 110 and configured to support a plurality of first blades 130. The plurality of mounting holes 112 extends spirally corresponding to the curvature of the first blades 130. For example, the first blades 130 are backward-curved blades. Three mounting holes 112 in one row corresponds to one first blade 130. The centrifugal fan 10 comprises a second plate 120, also referred to as the back plate, spaced apart from the first plate 110 in a direction parallel to the rotation axis R. In this example embodiment, the second plate 120 comprises a conical portion with a through hole in the middle. The through hole is configured for the centrifugal fan 10 to be sleeved onto the rotor shaft 30. Analogously, a plurality of mounting holes are also provided on the second plate 120 and configured to support the first blades 130. Each of the plurality of first blades 130 extends spirally in a plane perpendicular to the rotating axis R and extends from the first plate 110 to the second plate 120 in an axial direction. Each of the plurality of first blades 130 comprises a plurality of protrusions on each axial edge. The plurality of protrusions are configured to be mounted in respective mounting holes of the first plate 110 or the second plate 120. A plurality of additional back blades, namely the second blades 140, are arranged on the back side of the second plate 120. The details related to the air pressure will be described with reference to FIG. 3.

FIG. 3 schematically illustrates a cross-sectional view of the centrifugal fan of FIG. 2. As illustrated in FIG. 3, during the operation of the electrical machine 1, the centrifugal fan 10 rotates and the air will be drawn towards the centrifugal fan 10, forming an airflow F. When the airflow F reaches the first plate 120, the airflow F can pass through the air inlet 111 and flow to the conical portion of the second plate 120. The conical portion converts the direction of the airflow F from an axial direction into a radial direction. Consequently, the airflow F flows between the first blades 130 and exits the centrifugal fan 10 at the circumferential edge of the centrifugal fan 10. The path of the airflow F is illustrated as the dashed line.

In this case, the front sides of the first plate 110 and the conical portion are subjected to air pressures P3 and P4 while the back sides of the second plate 120 and conical portion are subjected to air pressures P1 and P2 respectively. The rotation of the plurality of second blades 140 will accelerate the airflow in vicinity of the second plate 120, thereby reducing the air pressure P1 and P2 applied to the back side of the second plate 120 to reduce the difference between the axial air pressure applied to the centrifugal fan 10, thus reducing the resultant force in the axial direction and avoiding the axial movement of the rotor 40.

In some embodiments, the plurality of second blades 140 may be dimensioned to minimize a resultant pressure applied to the centrifugal fan 10 in the direction parallel to the rotating axis R. With these embodiments, the dimension of a blade may include the size and the shape of the blade. The dimension of a blade may affect the pressure reduction performance. Therefore, by regulating the dimension of the second blades, the air pressure applied to the second blade 140 can be optimized to be close to the air pressure applied to the first blade 130 as much as possible so that a resultant pressure applied to the centrifugal fan 10 can be minimized.

In some embodiments, the dimension of the plurality of second blades 140 may be determined based on an outer diameter of the centrifugal fan 10, a width of the centrifugal fan 10 in the direction parallel to the rotating axis R and a distance between the centrifugal fan 10 and a first end cover 21 of the electrical machine 1. Specifically, the axial width of the second blade 140 is positively proportional to the width of the centrifugal fan 10. Since the width of the centrifugal fan generally depends on the width of the first blades, the axial width of the second blade may also be positively proportional to the width of the first blade 130. Further, the radial height of the second blade 140 is positively proportional to the outer diameter of the centrifugal fan 10. In addition, the axial distance between the centrifugal fan 10 and the housing 20 of the electrical machine 1 is positively proportional to the width of the second blade 140.

FIG. 4 schematically illustrates a perspective view of a centrifugal fan 10 viewed from a back side according to some embodiments of the present disclosure. As illustrated in FIG. 4, the first blade 130 and the second blade 140 are both curved. The first blade 130 has a first arc shape and the second blade 140 has a second arc shape. In addition, a curvature of the first arc shape is the same as a curvature of the second arc shape. In this example embodiment, each of the plurality of first blades 130 is integrally formed with a respective one of the plurality of second blades 140. Each of the plurality of mounting holes 121 on the second plate 120 is arranged to support the respective first blade 130 and the respective second blade 140. A cross section of the second blades 140 in a direction perpendicular to the rotating axis R is the same as that of the respective mounting hole 121.

In the example embodiment as illustrated in FIG. 4, the first blade 130 and the second blade 140 are integrally formed. Since the second blade 140 has a same cross section as the mounting hole on the second plate 120, the second blade 140 can pass through the mounting hole during mounting. When the second plate 120 abuts against the axial edge of the first blade 130, the second blade 140 is completely located on the other side of the second plate 120, i.e. between the back side of the second plate 20 and the first end cover 21. With this embodiment, the design for structure of the newly added second blades can be simplified, the welding stress can be reduced, and therefore the manufacturing costs can be reduced. The second blade 140 also keeps the characteristics of backward-curved blades, which reduces the impact loss when the air enters the centrifugal fan 10, thereby reducing the mechanical losses of the centrifugal fan. By providing the backward-curved second blades on the centrifugal fan, the influence on the efficiency of the electrical machine 1 is minimized.

Although there are three mounting holes on the second plate 120 corresponding to one first blade 130 as illustrated, the second blade 140 may be provided only in one mounting hole so that the number of the first blades 130 is the same as the number of the second blades 140.

It should be appreciated that one first blade 130 can correspond to other number of mounting holes and the number of the second blades 140 can be different from the number of the first blades 130. The present disclosure does not suggest any limitations with this regard.

FIG. 5 schematically illustrates a perspective view of a centrifugal fan 10 viewed from a back side according to some other embodiments of the present disclosure. For the sake of brevity, the descriptions with regard to the structures and elements similar to those illustrated in FIGS. 2-4 will be omitted. As illustrated in FIG. 5, each of the plurality of second blades 140 extends in a radial direction with respect to the rotating axis R. In this example embodiment, the cross section of each of the plurality of second blade 140 perpendicular to the rotating axis R is substantially a straight line. The plurality of second blades 140 are distributed symmetrically on the second plate 120 with respect to the rotating axis R and the number of the second blades 140 is the same as the number of the first blades 130.

With this example embodiment, for the already manufactured centrifugal fan, a second blade 140, especially radial back blades, which has a simple design, can be applied. That is, the design of second blades 140 can be achieved with fewer constraints.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. A centrifugal fan for cooling an electrical machine, the centrifugal fan being configured to rotate around a rotating axis, the centrifugal fan comprising:

a first plate comprising an air inlet configured to face a rotor of the electrical machine to receive air;

a second plate spaced apart from the first plate in a direction parallel to the rotating axis;

a plurality of first blades arranged between the first plate and the second plate; and a plurality of second blades arranged on a side of the second plate away from the first plate and configured to reduce an air pressure in vicinity of the second plate;

wherein each of the plurality of first blades has a first arc shape and each of the plurality of the second blades has a second arc shape, and wherein a curvature of the first arc shape is the same as a curvature of the second arc shape.

2. The centrifugal fan of claim 1, wherein the plurality of second blades is dimensioned to reduce a resultant pressure applied to the centrifugal fan in the direction parallel to the rotating axis.

3. The centrifugal fan of claim 1, wherein a dimension of the plurality of second blades is determined based on an outer diameter of the centrifugal fan, a width of the centrifugal fan in the direction parallel to the rotating axis and a distance between the centrifugal fan and an end cover of the electrical machine close to the centrifugal fan.

4. The centrifugal fan of claim 1, wherein each of the plurality of first blades is integrally formed with a respective one of the plurality of second blades, and the second plate comprises a plurality of mounting holes each arranged to support the respective first blade and the respective second blade.

5. The centrifugal fan of claim 4, wherein a cross section of the second blades in a direction perpendicular to the rotating axis is the same as that of the respective mounting hole.

6. The centrifugal fan of claim 1, wherein each of the plurality of second blades extends in a radial direction with respect to the rotating axis.

7. The centrifugal fan of claim 1, wherein the plurality of the second blades is distributed symmetrically on the second plate with respect to the rotating axis.

8. The centrifugal fan of claim 1, wherein the number of the second blades is the same as the number of the first blades.

9. An electrical machine comprising:

a housing including two end covers at two axial ends of the housing;

a rotor shaft rotatably arranged in two sleeve bearings at the two end covers; and the centrifugal fan according to claim 1, wherein the centrifugal fan is arranged around the rotor shaft.

10. The electrical machine of claim 9, wherein the plurality of second blades is dimensioned to reduce a resultant pressure applied to the centrifugal fan in the direction parallel to the rotating axis.

11. The electrical machine of claim 9, wherein a dimension of the plurality of second blades is determined based on an outer diameter of the centrifugal fan, a width of the centrifugal fan in the direction parallel to the rotating axis and a distance between the centrifugal fan and an end cover of the electrical machine close to the centrifugal fan.

12. The electrical machine of claim 9, wherein each of the plurality of first blades has a first arc shape and each of the plurality of the second blades has a second arc shape, and wherein a curvature of the first arc shape is the same as a curvature of the second arc shape.

13. The electrical machine of claim 9, wherein each of the plurality of first blades is integrally formed with a respective one of the plurality of second blades, and the second plate comprises a plurality of mounting holes each arranged to support the respective first blade and the respective second blade.

14. The electrical machine of claim 13, wherein a cross section of the second blades in a direction perpendicular to the rotating axis is the same as that of the respective mounting hole.

15. The electrical machine of claim 9, wherein each of the plurality of second blades extends in a radial direction with respect to the rotating axis.

16. The electrical machine of claim 9, wherein the plurality of the second blades is distributed symmetrically on the second plate with respect to the rotating axis.

17. The electrical machine of claim 9, wherein the number of the second blades is the same as the number of the first blades.

* * * * *